United States Patent
Li

(10) Patent No.: US 11,039,116 B2
(45) Date of Patent: Jun. 15, 2021

(54) ELECTRONIC DEVICE AND SUBTITLE-EMBEDDING METHOD FOR VIRTUAL-REALITY VIDEO

(71) Applicant: HTC Corporation, Taoyuan (TW)

(72) Inventor: Kuan-Wei Li, Taoyuan (TW)

(73) Assignee: HTC Corporation, Taoyuan (TW)

( * ) Notice: Subject to any disclaimer, the term of this patent is extended or adjusted under 35 U.S.C. 154(b) by 52 days.

(21) Appl. No.: 16/667,426

(22) Filed: Oct. 29, 2019

(65) Prior Publication Data

US 2021/0127105 A1    Apr. 29, 2021

(51) Int. Cl.
*H04N 13/183*   (2018.01)
*H04N 13/178*   (2018.01)
*H04N 13/00*   (2018.01)

(52) U.S. Cl.
CPC ......... *H04N 13/183* (2018.05); *H04N 13/178* (2018.05); *H04N 2013/0081* (2013.01)

(58) Field of Classification Search
CPC ............... H04N 13/183; H04N 13/178; H04N 2013/0081
See application file for complete search history.

(56) References Cited

U.S. PATENT DOCUMENTS

| 2013/0010064 A1* | 1/2013 | Okuda | H04N 13/128 348/43 |
| 2014/0036046 A1* | 2/2014 | Hasegawa | H04N 13/31 348/54 |
| 2015/0130913 A1* | 5/2015 | Shimizu | H04N 13/31 348/54 |
| 2016/0145734 A1* | 5/2016 | Huang | C23C 14/5806 106/1.19 |

FOREIGN PATENT DOCUMENTS

| CN | 108616730 A | 10/2018 |
| CN | 109561263 A | 4/2019 |

* cited by examiner

*Primary Examiner* — Shawn S An
(74) *Attorney, Agent, or Firm* — Birch, Stewart, Kolasch & Birch, LLP

(57) ABSTRACT

A subtitle-embedding method for a virtual-reality (VR) video is provided. The method includes the following steps: obtaining a VR video; in response to execution of a display operation of the VR video, analyzing a current stereoscopic image of the VR video to obtain at least one object and an object parallax corresponding to the object in the current stereoscopic image; adjusting a subtitle parallax of a subtitle to be superimposed onto the current stereoscopic image according to the object parallax, wherein the subtitle parallax is greater than the object parallax; and superimposing the subtitle onto the current stereoscopic image using the calculated subtitle parallax.

14 Claims, 4 Drawing Sheets

ELECTRONIC DEVICE AND SUBTITLE-EMBEDDING METHOD FOR VIRTUAL-REALITY VIDEO

BACKGROUND OF THE INVENTION

Field of the Invention

The invention relates to electronic devices, and, in particular, to an electronic device and a subtitle-embedding method for a virtual-reality (VR) video.

Description of the Related Art

With the advent of technology, portable electronic devices such as smartphones and tablets have become more and more popular. Some smartphones, digital cameras, and digital camcorders on the market are capable of recording virtual reality (VR) videos. However, after recording a VR video, there are often many users who need to watch the recorded VR video with subtitles. This indicates that the VR playback device or the host needs to instantly overlay characters in the subtitle file on the left-eye image and the right-eye image of the VR video.

While the VR video is playing, the depth of the objects in the VR video may change, and a conventional subtitle-embedding method for a VR video generally has a fixed subtitle depth. The conventional subtitle-embedding method cannot determine the relationship between subtitles and the objects in the VR video in advance while playing the VR video. Accordingly, when the depth of the subtitle is deeper than that of the object on which the subtitle is superimposed, the user may visually feel uncomfortable. For example, with subtitles that need to be clearly seen, the user may perceive that there is a translucent object on the subtitle, which will cause discomfort and a lack of visual clarity.

BRIEF SUMMARY OF THE INVENTION

An electronic device and a subtitle-embedding method for VR video are provided to solve the aforementioned problem.

In an exemplary embodiment, a subtitle-embedding method for a virtual-reality (VR) video is provided. The method includes the following steps: obtaining a VR video; in response to execution of a display operation of the VR video, analyzing a current stereoscopic image of the VR video to obtain at least one object and an object parallax corresponding to the object in the current stereoscopic image; adjusting a subtitle parallax of a subtitle to be superimposed onto the current stereoscopic image according to the object parallax, wherein the subtitle parallax is greater than the object parallax; and superimposing the subtitle onto the current stereoscopic image using the calculated subtitle parallax.

In some embodiments, the method further includes the following step: displaying the current stereoscopic image on which a subtitle has been superimposed onto a VR apparatus.

In some embodiments, the subtitle has a default subtitle parallax, and the method further includes the following steps: determining whether the object parallax is greater than the default subtitle parallax; when the object parallax is not greater than the default subtitle parallax, setting the subtitle parallax to the default subtitle parallax; and when the object parallax is greater than the default subtitle parallax, setting the subtitle parallax to a value of the object parallax plus a fixed constant greater than 0, so that the subtitle parallax is greater than the object parallax. In addition, when the object parallax is greater than the default subtitle parallax and the adjusted subtitle parallax is greater than a predetermined parallax, placing the subtitle to an opposite side of the object in the current stereoscopic image using the default subtitle parallax.

In some embodiments, the method further includes the following step: adjusting width and/or height of a subtitle block corresponding to the subtitle to be superimposed onto the current stereoscopic image, so that the subtitle rendered in the current stereoscopic image and the object do not overlap.

In some embodiments, the method further includes the following steps: analyzing the object parallax of the object in a plurality of subsequent stereoscopic images, that are subsequent to the current stereoscopic image in the VR video, within a predetermined number; and in response to the object parallax of the object in one or more of the predetermined number of subsequent stereoscopic images being greater than the default subtitle parallax, superimposing the subtitle onto the predetermined number of the subsequent stereoscopic images using the subtitle parallax of the current stereoscopic image.

In some embodiments, the VR video is pre-recorded by a portable electronic device equipped with dual cameras.

In another exemplary embodiment, an electronic device is provided. The electronic device includes a storage device and a processor. The storage device is configured to store an image-displaying application. The processor is configured to obtain a virtual-reality (VR) video, and execute a display operation of the VR video using the image-displaying application. In response to execution of the display operation of the VR video, the processor analyzes a current stereoscopic image of the VR video to obtain at least one object and an object parallax corresponding to the object in the current stereoscopic image. The processor adjusts a subtitle parallax of a subtitle to be superimposed onto the current stereoscopic image according to the object parallax. The subtitle parallax is greater than the object parallax. The processor superimposes the subtitle onto the current stereoscopic image using the calculated subtitle parallax.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
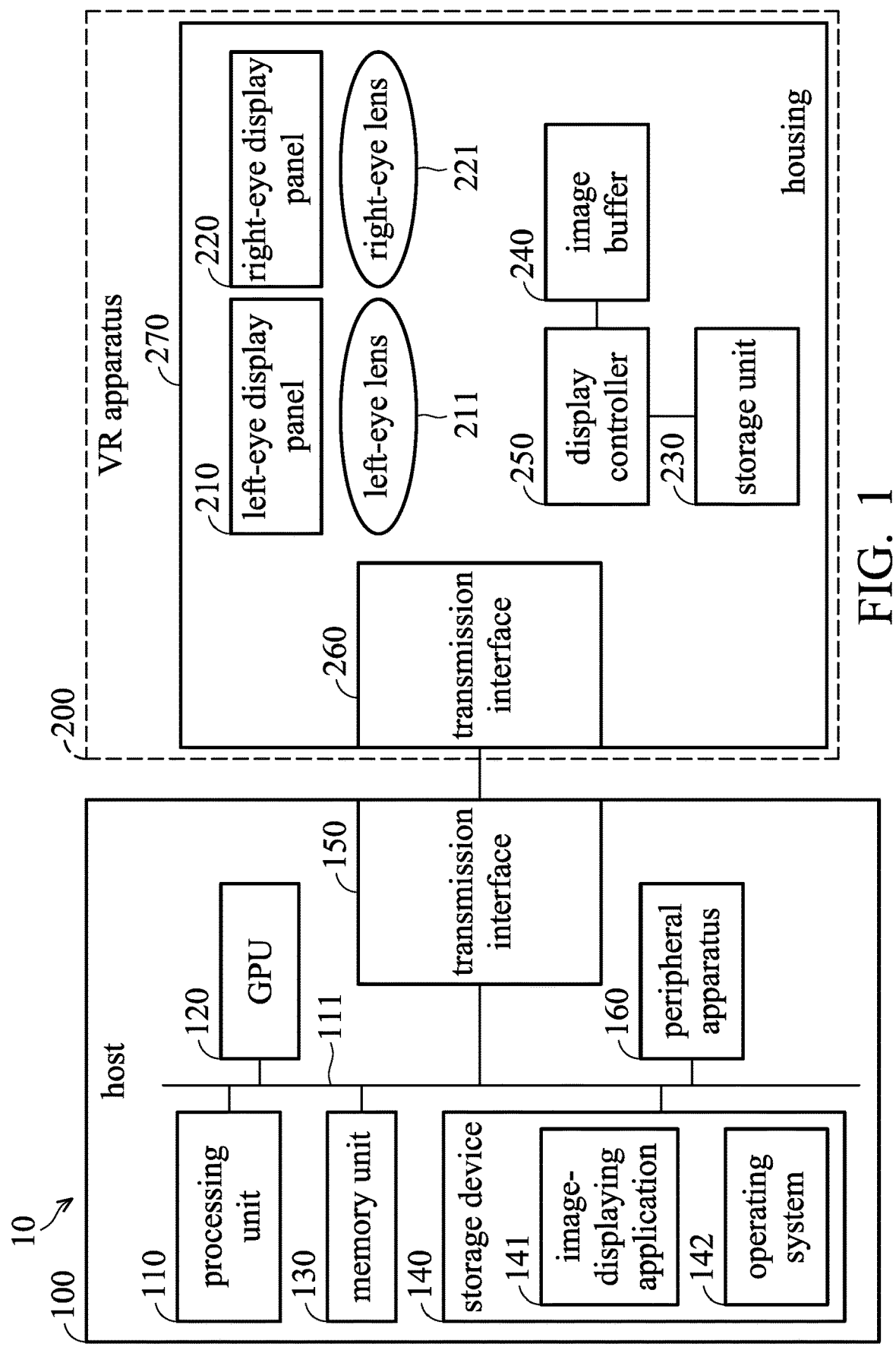
FIG. 1 is a schematic block diagram of a VR system in accordance with an embodiment of the invention.

FIG. 1 is a schematic block diagram of a virtual-reality (VR) system in accordance with an embodiment of the invention. The VR system 100 may include a host 100 and a VR apparatus 200, wherein the host 100 has a signal connection to the VR apparatus 200. The host 100 may be an electronic device such as a personal computer or a server. The host 100 may include a processing unit 110, a graphics processing unit (GPU) 120, a memory unit 130, a storage device 140, one or more transmission interface 150, and one or more peripheral apparatuses 160. The processing unit 110, for example, may be a central processing unit (CPU), a general-purpose processor, etc., but the invention is not limited thereto. The GPU 120 may be a graphics processing unit on a video adapter or a graphics processing unit that is integrated into the processing unit 110.

The memory unit 130 may be a random access memory, such as a dynamic random access memory (DRAM) or a static random access memory (SRAM) but the invention is not limited thereto. The storage device 140 may be a non-volatile memory such as a hard disk drive (HDD), a solid-state disk (SSD), a flash memory, or a read-only memory, but the invention is not limited thereto.

The transmission interface 150 may include wired transmission interfaces and/or wireless transmission interfaces. The wired transmission interfaces may include: high definition multimedia interface (HDMI), DisplayPort (DP) interface, embedded DisplayPort (eDP) interface, universal serial bus (USB) interface, USB Type-C interface, Thunderbolt interface, digital video interface (DVI), or a combination thereof. The wireless transmission interfaces may include 5th-generation (5G) wireless system, Bluetooth, Wireless Fidelity (Wi-Fi), near-field communication (NFC) interface, etc., but the invention is not limited thereto. The peripheral apparatus 160, for example, may include input apparatuses such as a keyboard, a mouse, a touch pad, etc., but the invention is not limited thereto.

For example, the storage device 140 may store an image-displaying application 141 and an operation system 142 (e.g., Windows, Linux, MacOS, etc.), and the processing unit 110 may load the operating system 142 and the image-display application into the memory unit 130 for execution. The GPU 120, for example, may perform graphics processing of the image-displaying application performed by the processing unit 110 to generate an image signal that includes one or more images, and transmit the image signal to the VR apparatus 200 via one of the transmission interfaces 150 (e.g., HDMI or DisplayPort interface).

The VR apparatus 200, for example, may be head-mounted display (HMD). The VR apparatus 200 may include a left-eye display panel 210 and a corresponding left-eye lens 211, a right-eye display panel 220 and a corresponding right-eye lens 221, a storage unit 230, an image buffer, a display controller 250, and one or more transmission interface 260, and a housing 270. The left-eye display panel 210, left-eye lens 211, right-eye display panel 220, and right-eye lens 221 are disposed in the housing 270 using a predetermined optical arrangement, and the housing 270 may include a strap or other auxiliary device (not shown) for the user to wear the VR apparatus 200 to view the images via the VR apparatus.

The left-eye display panel 210 and right-eye display panel 220, for example, may be liquid-crystal display (LCD) panels, light-emitting diode (LED) panels, organic light-emitting diode (OLED) panels, but the invention is not limited thereto. In some embodiments, the left-eye display panel 210 and the right-eye display panel may be different and separate display panels, or implemented by the same display panel. In addition, the left-eye display panel 210 and right-eye display panel 220 are arranged side by side and parallel, and there is no angular different between these two display panels. In some other embodiments, the left-eye display panel 210 and right-eye display panel 220 are arranged side by side and non-parallel, and there is an angular different between these two display panels.

The transmission interface 260 may include wired transmission interfaces and/or wireless transmission interfaces. The wired transmission interfaces may include: high definition multimedia interface (HDMI), DisplayPort (DP) interface, embedded DisplayPort (eDP) interface, universal serial bus (USB) interface, USB Type-C interface, Thunderbolt interface, digital video interface (DVI), or a combination thereof. The wireless transmission interfaces may include 5th-generation (5G) wireless system, Bluetooth, Wireless Fidelity (Wi-Fi), near-field communication (NFC) interface, etc., but the invention is not limited thereto. The peripheral apparatus 160, for example, may include input apparatuses such as a keyboard, a mouse, a touch pad, etc., but the invention is not limited thereto.

The display controller 250, for example, may be an application-specific integrated circuit (ASIC), a system-on-chip (SoC), a processing, or a microcontroller, but the invention is not limited thereto. The storage unit 230, for example, may be a non-volatile memory such as a read-only memory, an erasable programmable read-only memory (EPROM), or an electrically erasable programmable read-only memory (EEPROM). The storage unit 230 is configured to store firmware 231 associated with the display apparatus 200. The storage unit 230, for example, can be disposed outside the display controller 250, or can be integrated into the display controller 250. The image buffer 240, for example, may be a dynamic random access memory (DRAM) that is configured to temporarily store the image signal to be displayed and/or the temporary files generated by the image process performed by the display controller 250.

In some embodiments, the image-displaying application 141 executed by the processing unit 110 may display a VR video pre-recorded by a portable electronic device (e.g., a smartphone or a digital camera equipped with dual cameras), wherein the recorded VR video does not have subtitles embedded therein. In response to displaying the VR video, the image-displaying application 141 may add a subtitle file onto a corresponding image signal in the VR video, or superimposing subtitles onto a corresponding image signal in the VR video using instant speech recognition. For example, the aforementioned image signal may include a left-eye images and a right-eye image, and the subtitle characters embedded in the left-eye image and right-eye image are rendered stereoscopically. In addition, the image-displaying application 141 may adjust the parallax between the subtitle characters embedded in the left-eye image and right-eye image, thereby alternating the depth of the subtitle character viewed by the user, and the details will be described later.

The display controller 250 may receive the image signal from the host through the transmission interface 260, wherein the image signal, for example, may include a left-eye image and right-eye image on which the host 100 has embedded subtitles. The display controller 250 may store the received image signal in the image buffer 240. Afterwards, the display controller 250 may read the image signal stored in the image buffer 240, and display the left-eye image and right-eye image of the image signal on the left-eye display panel 210 and right-eye display panel 220 respectively via the left-eye lens 211 and right-eye lens 221, thereby perceiving stereoscopic vision.

In another embodiment, the display controller 250 may receive the image signal of the VR video to be displayed from the host 100 through the transmission interface 260, wherein the aforementioned image signal may include a left-eye image and right-eye image on which subtitles have not been embedded. The display controller 250 (or another processor of the VR apparatus 200) may read a subtitle file corresponding to the image signal, and then superimposing the subtitles in the subtitle file onto the image signal of the VR video. Alternatively, the display controller 250 may perform instant speech recognition and superimpose the recognized subtitle onto the image signal of the VR video. For convenience of description, in the embodiment to be described later, the host 100 will superimpose a subtitle onto the image signal of the VR video to be displayed.

Figure 2A:
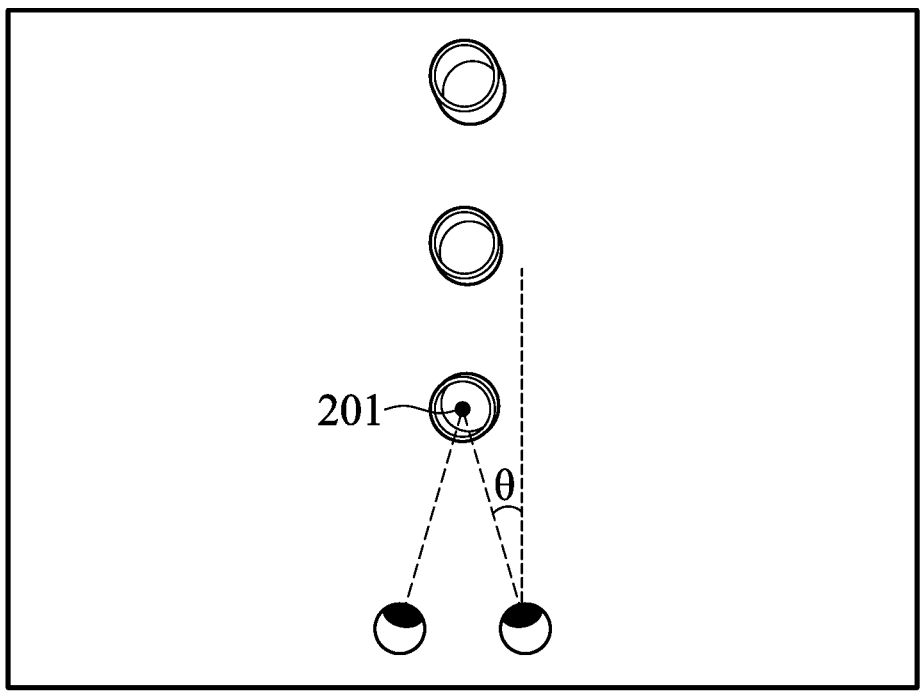
FIGS. 2A and 2B are diagrams of binocular convergence in accordance with an embodiment of the invention.
Figure 2B:
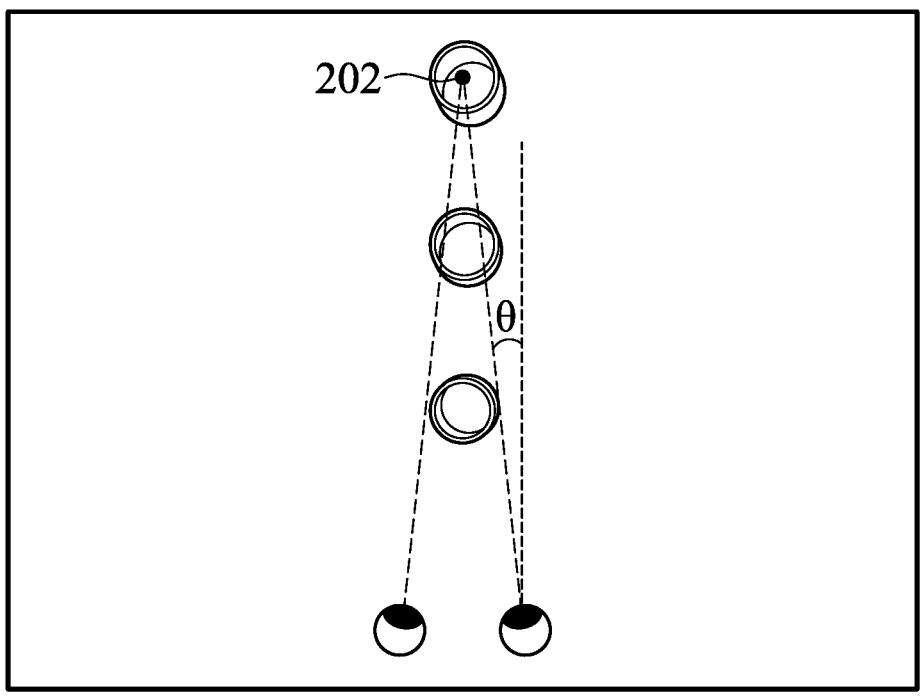

FIGS. 2A and 2B are diagrams of binocular convergence in accordance with an embodiment of the invention.

In an embodiment, human beings' three-dimensional (stereoscopic) vision is mainly based on two conditions: binocular convergence and binocular disparity (parallax). Binocular convergence refers to the angle between the user's eye and the object being observed (also referred to as the convergence point 201), such as the angle θ. As the angle θ grows larger, the user will feel that the object (e.g., convergence point 201) is moving closer to the user, as shown in FIG. 2A. Conversely, as the angle θ gets smaller, the user will feel that the object (e.g., convergence point 202) is getting farther away from the user, as shown in FIG. 2B.

When the angle θ is fixed, the user will perceive that the object between the user's eye and the convergence point will be closer to the user, and that the object behind the convergence point will farther away from the user. For example, the distance between the object and the user in three-dimensional space can be determined, for example, using depth.

The conventional subtitle-embedding method for a VR video is to anchor the auto-generated or plug-in subtitle to a fixed position of the stereoscopic image using a fixed depth in the visible range of the viewer, and does not consider the relative position between the subtitle and object in the VR video. Accordingly, the conventional subtitle-embedding method tends to cause the depth of the subtitle to be deeper than the depth of the object in the stereoscopic image. Therefore, the viewer will see that a translucent object is covered on the subtitle that needs to be clearly seen, which may cause that the user cannot view the subtitle clearly and feel uncomfortable, thus impacting user experience.

Specifically, each of one or more objects in the image signal of the VR video has a corresponding depth. Since the VR video is pre-recorded, the host 100 (or the VR apparatus 200) cannot know in advance the depth of each object in the scene of the VR video before playing the VR video. In response to the host 100 (or the VR apparatus 200) displaying the image signal (including both the left-eye image and right-eye image) of the VR video, the host 100 (or VR apparatus 200) needs to first calculate the depth of each object in each image of the image signal, and determine the appropriate depth of the subtitle to be superimposed onto each image. For example, the appropriate depth may indicate a depth that is smaller than the object depth: That is, the position where the subtitle is rendered is in front of the object, so that the user will not feel uncomfortable when viewing the VR video.

Figure 3:
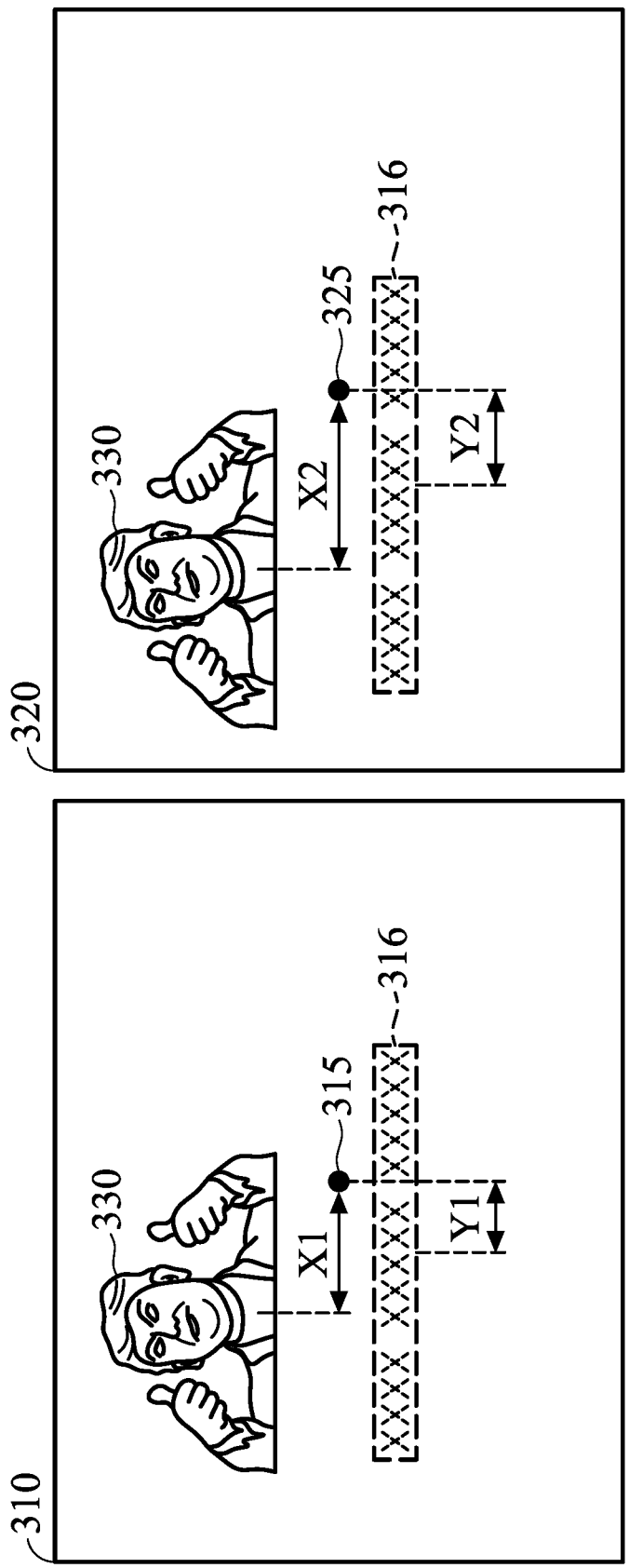
FIG. 3 is a diagram of the parallax of the object and subtitle in the left-eye image and right-eye image in accordance with an embodiment of the invention.

FIG. 3 is a diagram of the parallax of the object and subtitle in the left-eye image and right-eye image in accordance with an embodiment of the invention.

In an embodiment, the host 100 may first detect the same object 330 in the left-eye image 310 and right-eye image 320 at time t=n. Since there is a parallax $\Delta X$ between the object 330 in the left-eye image 310 and the same object 330 in right-eye image 320 and the parallax $\Delta X$ corresponds to an object depth D, the host 100 can calculate that the distance between the object 330 and the center 315 of the left-eye image 310 is X1 and the distance between the object 330 and the center 325 of the right-eye image 320 is X2, where the distances X1 and X2 may be pixel distances. The difference between distances X1 and X2, such as the object parallax $\Delta X$, can be expressed by the following equation:

$$\Delta X = |X1 - X2|.$$

In addition, the host 100 can set the default subtitle depth Z of the subtitle to be superimposed onto the left-eye image 310 and right-eye image 320, wherein the default subtitle depth Z, for example, may be the ideal depth that the developer thinks the subtitle should be placed. If the default subtitle depth Z is smaller than or equal to the object depth D (i.e., $Z \leq D$), it indicates that the object is farther away and the subtitle is closer to the viewer, so that the viewer will not feel uncomfortable. If the default subtitle depth Z is greater than the object depth D (i.e., $Z > D$), it indicates that the object is closer to and the subtitle is farther away from the viewer. If the subtitle is superimposed onto the stereoscopic image, the user will feel uncomfortable.

Accordingly, when the host 100 determines that the predetermined subtitle depth Z of the subtitle in the stereoscopic image is greater than the object depth D of the object in the stereoscopic image, the host 100 will not use the default subtitle depth Z, and automatically adjust the subtitle depth to an appropriate depth, so that the adjusted subtitle depth is smaller than the object depth D, thereby preventing the user from feeling uncomfortable while viewing the VR video. For example, the host 100 may adjust the parallax of the subtitle between the left-eye image and right-eye image to alternate the subtitle depth S. Because the subtitle to be superimposed may be a string including one or more words, the host 100 can calculate, using the default subtitle Z, the distance Y1 between the center (or approximately the center) of the string block 316 of the string and the center 315 of the left-eye image 310, and calculate the distance Y2 between the center of the string block 316 and the center 325 of the right-eye image 320. The difference between the distances Y1 and Y2 is the predetermined subtitle parallax $\Delta Y$ that can be expressed by the following equation:

$$\Delta Y = |Y1 - Y2|$$

Afterwards, the host 100 may adjust the distances Y1 and Y2 respectively to distances Y1' and Y2', and the new subtitle parallax $\Delta Y'$ can be expressed by the following equations: $\Delta Y' = |Y1 - Y2'|$, and $\Delta Y' > \Delta X + t$, wherein t is a fixed constant larger than 0. The new subtitle parallax $\Delta Y'$ corresponds to the adjusted subtitle depth S.

In some embodiments, the host 100, for example, may increase the distance Y1 by $(\Delta Y' - \Delta Y)/2$ and decrease the distance Y2 by $(\Delta Y' - \Delta Y)/2$, so that the adjusted subtitle will not deviate too much from the default anchor point of the subtitle, but the invention is not limited thereto. In other words, when the subtitle parallax $\Delta Y'$ is greater than the object parallax $\Delta X$ between the left-eye and right-eye images, it indicates that the subtitle depth S is smaller than the object depth D between the left-eye and right-eye images.

In the aforementioned embodiment, since the object depth D in the stereoscopic image may be very close to the user, if the subtitle depth is adjusted to a depth that is smaller than the object depth D, the user may still be unable to see the subtitle clearly and feel uncomfortable. In this case, the host 100 may determine the relative position of the object 330 in the stereoscopic image. If the position of the object 330 is below the stereoscopic image, the host 100 may anchor the subtitle to be superimposed using the default subtitle depth Z on the opposite side of the stereoscopic image (e.g., above the stereoscopic image), and/or adjust the width and/or height of the subtitle block, so that the subtitle rendered in the stereoscopic does not overlap the object.

In some embodiments, while playing the VR video, the host 100 may pre-calculate the corresponding object depth of one or more objects in the plurality of subsequent stereoscopic images, for example, at time t=n+1, n+2 n+3, and so on. When the host 100 determines that some objects in the subsequent images within a predetermined number (e.g., 5 images from time t=n+1 to n+5) appear in the scene in a very short time and the object depth of each object is smaller than the calculated subtitle depth at time t=n, if the host 100 still continues to perform the dynamic mechanism to adjust the subtitle depth, the user may feel that the subtitle is flickering, which is not suitable for the user to view the VR video. Thus, in this case, the host 100 may temporarily stops the dynamic mechanism to adjust the subtitle depth, such as setting the calculated subtitle depth at time t=n as the subtitle depth in the subsequent stereoscopic images within the predetermined number.

Figure 4:
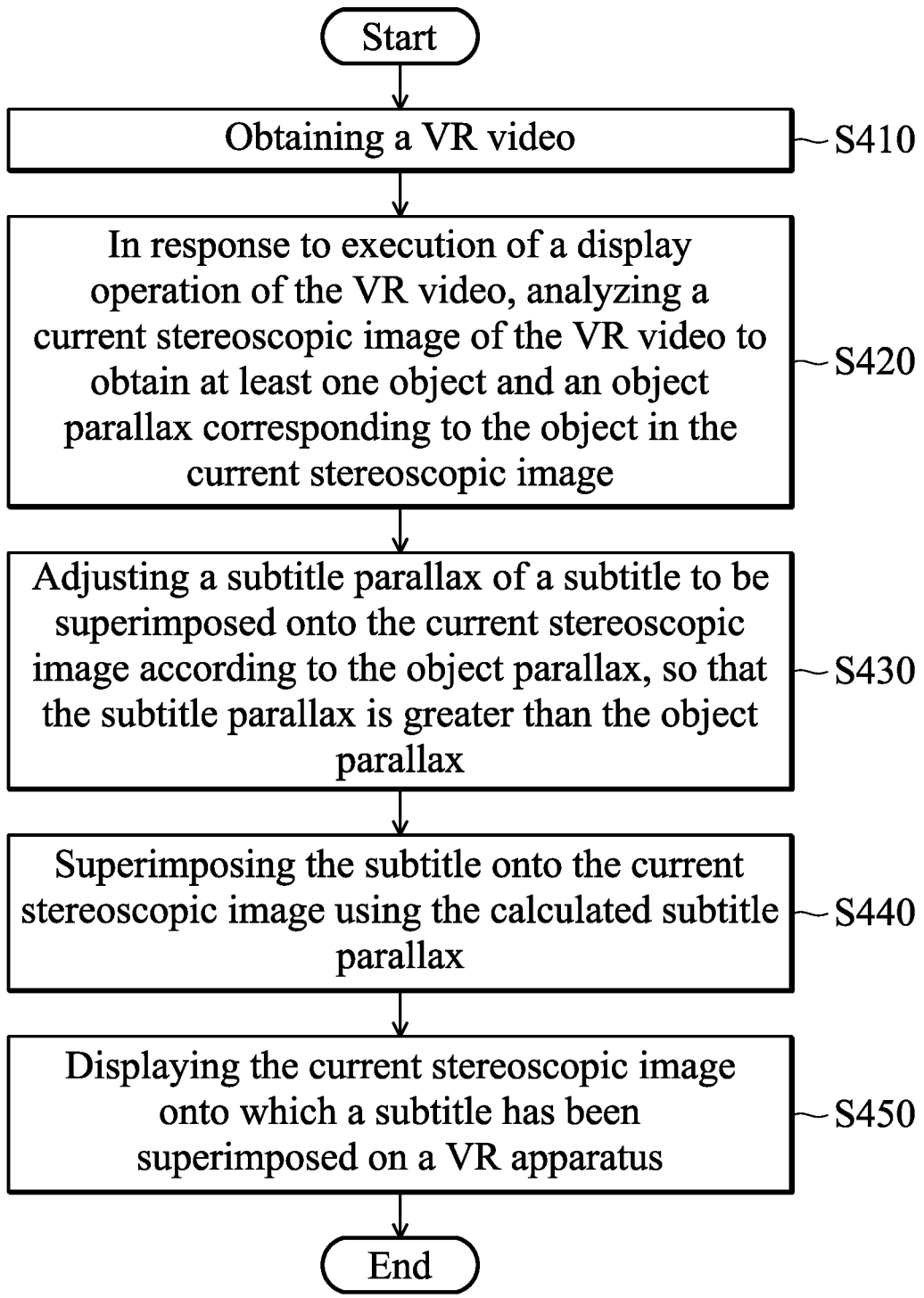
FIG. 4 is a flow chart of a subtitle-embedding method for a VR video in accordance with an embodiment of the invention.

FIG. 4 is a flow chart of a subtitle-embedding method for a VR video in accordance with an embodiment of the invention.

In step S410, a virtual-reality (VR) video is obtained. For example, the VR video may be a VR video pre-recorded by a portable electronic device (e.g., a smartphone or digital camera equipped with dual cameras), and no subtitle has been embedded in the VR video. In addition, the VR video includes a plurality of stereoscopic images, and each stereoscopic image (e.g., including a left-eye image and a right-eye image) includes at least one object.

In step S420, in response to execution of a display operation of the VR video, a current stereoscopic image of the VR video is analyzed to obtain at least one object and an object parallax corresponding to the object in the current stereoscopic image.

In step S430, a subtitle parallax of the subtitle to be superimposed onto the current stereoscopic image is adjusted according to the object parallax, so that the subtitle parallax is greater than the object parallax.

In step S440, the subtitle is superimposed onto the current stereoscopic image using the calculated subtitle parallax. For example, the host 100 may superimposed the subtitle onto a fixed anchor of the current stereoscopic image. In some embodiments, when the object parallax is greater than the default subtitle parallax and the adjusted subtitle parallax is greater than a predetermined parallax, the subtitle is placed on an opposite side of the object in the current stereoscopic image using the default subtitle parallax. In addition, the host 100 may also adjust the width and/or height of the subtitle block corresponding to the subtitle to be superimposed onto the current stereoscopic image, so that the subtitle rendered in the current stereoscopic image and the object do not overlap.

In step S450, the current stereoscopic image on which a subtitle has been added is displayed on the VR apparatus 200. For example, the current stereoscopic image may include a left-eye image and a right-eye image that are displayed on the left-eye display panel 210 and right-eye display panel 220 of the VR apparatus 200. The user may view the displayed left-eye image and right-eye image respectively through the corresponding left-eye lens 211 and right-eye lens 221, thereby feeling the stereoscopic vision.

In view of the above, an electronic device and a subtitle-embedding method for a VR video are provided in the present invention. The electronic device and the subtitle-embedding method are capable of analyzing the object parallax (e.g., corresponding to the object depth) of the object in the stereoscopic image of the VR video, and dynamically adjusting the subtitle parallax of the subtitle to be superimposed onto the stereoscopic image according to the object parallax, so that the adjusted subtitle parallax is greater than the object parallax. That is, the subtitle depth is smaller than the object depth, and thus the user does not feel the unclear subtitle and uncomfortable due to the subtitle being behind the object while viewing the VR video, thereby improving user experience.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A subtitle-embedding method for a virtual-reality (VR) video, comprising:
   obtaining a VR video;
   in response to execution of a display operation of the VR video, analyzing a current stereoscopic image of the VR video to obtain at least one object and an object parallax corresponding to the object in the current stereoscopic image;
   adjusting a subtitle parallax of a subtitle to be superimposed onto the current stereoscopic image according to the object parallax, wherein the subtitle parallax is greater than the object parallax; and
   superimposing the subtitle onto the current stereoscopic image using the calculated subtitle parallax.

2. The subtitle-embedding method as claimed in claim 1, further comprising:
   displaying the current stereoscopic image onto which a subtitle has been superimposed on a VR apparatus.

3. The subtitle-embedding method as claimed in claim 1, wherein the subtitle has a default subtitle parallax, and the method further comprises:
   determining whether the object parallax is greater than the default subtitle parallax;
   when the object parallax is not greater than the default subtitle parallax, setting the subtitle parallax to the default subtitle parallax; and
   when the object parallax is greater than the default subtitle parallax, setting the subtitle parallax to a value of the object parallax plus a fixed constant greater than 0, so that the subtitle parallax is greater than the object parallax.

4. The subtitle-embedding method as claimed in claim 3, further comprising:
   when the object parallax is greater than the default subtitle parallax and the adjusted subtitle parallax is greater than a predetermined parallax, superimposing the subtitle onto an opposite side of the object in the current stereoscopic image using the default subtitle parallax.

5. The subtitle-embedding method as claimed in claim 4, further comprising:

adjusting width and/or height of a subtitle block corresponding to the subtitle to be superimposed onto the current stereoscopic image, so that the subtitle rendered in the current stereoscopic image and the object do not overlap.

6. The subtitle-embedding method as claimed in claim 3, further comprising:
analyzing the object parallax of the object in a predetermined number of subsequent stereoscopic images, that are subsequent to the current stereoscopic image in the VR video; and
in response to the object parallax of the object in one or more of the predetermined number of subsequent stereoscopic images being greater than the default subtitle parallax, superimposing the subtitle onto the subsequent stereoscopic images within the predetermined number using the subtitle parallax of the current stereoscopic image.

7. The subtitle-embedding method as claimed in claim 1, wherein the VR video is pre-recorded by a portable electronic device equipped with dual cameras.

8. An electronic device, comprising:
a storage device, configured to store an image-displaying application; and
a processor, configured to obtain a virtual-reality (VR) video, and execute a display operation of the VR video using the image-displaying application,
wherein in response to execution of the display operation of the VR video, the processor analyzes a current stereoscopic image of the VR video to obtain at least one object and an object parallax corresponding to the object in the current stereoscopic image,
wherein the processor adjusts a subtitle parallax of a subtitle to be superimposed onto the current stereoscopic image according to the object parallax, wherein the subtitle parallax is greater than the object parallax; and
wherein the processor superimposes the subtitle to the current stereoscopic image using the calculated subtitle parallax.

9. The electronic device as claimed in claim 8, wherein the processor displays the current stereoscopic image onto which a subtitle has been superimposed on a VR apparatus.

10. The electronic device as claimed in claim 8, wherein the subtitle has a default subtitle parallax, and the processor further determines whether the object parallax is greater than the default subtitle parallax,
wherein when the object parallax is not greater than the default subtitle parallax, the processor sets the subtitle parallax to the default subtitle parallax,
when the object parallax is greater than the default subtitle parallax, the processor sets the subtitle parallax to a value of the object parallax plus a fixed constant greater than 0, so that the subtitle parallax is greater than the object parallax.

11. The electronic device as claimed in claim 10, wherein when the object parallax is greater than the default subtitle parallax and the adjusted subtitle parallax is greater than a predetermined parallax, the processor superimposes the subtitle onto an opposite side of the object in the current stereoscopic image using the default subtitle parallax.

12. The electronic device as claimed in claim 11, wherein the processor adjusts width and/or height of a subtitle block corresponding to the subtitle to be superimposed onto the current stereoscopic image, so that the subtitle rendered in the current stereoscopic image and the object do not overlap.

13. The electronic device as claimed in claim 8, wherein the processor further analyzes the object parallax of the object in a plurality of subsequent stereoscopic images, that are subsequent to the current stereoscopic image in the VR video, within a predetermined number,
wherein in response to the object parallax of the object in one or more of the subsequent stereoscopic images within the predetermined number being greater than the default subtitle parallax, the processor superimposes the subtitle to the subsequent stereoscopic images within the predetermined number using the subtitle parallax of the current stereoscopic image.

14. The electronic device as claimed in claim 8, wherein the VR video is pre-recorded by a portable electronic device equipped with dual cameras.

* * * * *